United States Patent [19]

Shieh et al.

[11] Patent Number: 5,894,240
[45] Date of Patent: Apr. 13, 1999

[54] RESET METHODS AND APPARATUS FOR MICROCONTROLLERS HAVING BIDIRECTIONAL RESET LINES

[75] Inventors: Sui Ping Shieh, Los Altos, Calif.; Rune Domsten, Vanlcse, Denmark

[73] Assignee: Maxim Integrated Products, Inc., Sunnyvale, Calif.

[21] Appl. No.: 08/929,177

[22] Filed: Sep. 8, 1997

Related U.S. Application Data

[63] Continuation of application No. 08/616,172, Mar. 15, 1996, abandoned.
[51] Int. Cl.[6] .............................. H03K 3/01; H03K 17/22
[52] U.S. Cl. .............................. 327/142; 327/143; 327/198
[58] Field of Search .................................. 327/142, 143, 327/198, 80, 518, 545, 546, 170, 24, 50, 51, 538; 326/30

[56] References Cited

U.S. PATENT DOCUMENTS 5,164,613  11/1992  Mumper et al. .................. 327/143

FOREIGN PATENT DOCUMENTS 4129416  4/1992  Japan ................................ 327/143

*Primary Examiner*—Dinh Le
*Attorney, Agent, or Firm*—Blakely, Sokoloff, Taylor & Zafman LLP

[57] ABSTRACT

Method and apparatus for use in a microcontroller based system for detecting an active reset followed by the release of the reset line, and upon the release of the reset line, rapidly driving the reset line of the system to the inactive state to prevent the microcontroller from falsely interpreting the reset line voltage level as being a non-microcontroller initiated reset. The reset line is then released, after a short time delay so as to not interfere with any succeeding reset signal.

19 Claims, 1 Drawing Sheet

RESET METHODS AND APPARATUS FOR MICROCONTROLLERS HAVING BIDIRECTIONAL RESET LINES

This is a Continuation Application of application Ser. No. 08/616,172, filed Mar. 15, 1996, now abandoned.

BACKGROUND OF THE INVENTION

1. Field of the Invention

The present invention relates to the field of microcontroller systems, more particularly reset methods and apparatus therefor.

2. Prior Art

The reset input of the Motorola 68HC11/16 microcontroller is a bi-directional input/output pin. It can be driven low externally to reset the microcontroller, or the microcontroller itself can drive it low, e.g., an internal watchdog timer fault. Typically, a number of other devices that may require resetting are also connected to this bus, a shown in FIG. 1.

Because the reset pin of the microcontroller is bi-directional, there are unique timing requirements associated with the change of state of the pin. Specifically, after a microcontroller generated reset, the microcontroller will release the reset output, wait 4 E cycles, and poll the state of the pin. This is done to ensure that no other device that is connected to the reset bus is asserting a reset. The factory recommended typical application suggests a 4.7 Kohm resistor connected between $V_{CC}$ and the reset pin to provide a pull-up current. Using this approach, the maximum capacitance allowed on the line is limited. For example, if E clock is 6 Mhz, 4 E cycles take 666 ns. The bus requires 1.6 RC time constants to reach the 0.8 $V_{CC}$, which is $V_{ih}$ for the reset pin. This implies that a maximum of 88.6 pF is allowed on the bus. If upon polling the reset line after the 4 E cycles the microcontroller finds the line to still be low, the microcontroller interprets the apparent low state to mean that the reset signal was externally generated, and accordingly will go through a more involved reset procedure.

It is thus desirable to have the reset line return to an apparent high state within 4 E cycles after a microcontroller initiated reset to avoid the unnecessary, more time consuming reset sequence associated with an externally (non-microcontroller) initiated reset operation.

SUMMARY OF THE INVENTION

Method and apparatus for use in a microcontroller based system for detecting an active reset followed by the release of the reset line, and upon the release of the reset line, rapidly driving the reset line of the system to the inactive state to prevent the microcontroller from falsely interpreting the reset line voltage level as being a non-microcontroller initiated reset. The reset line is then released, after a short time delay so as to not interfere with any succeeding reset signal.

The specific embodiment disclosed is intended for use in Motorola 68HC11/16 microcontroller based systems, though the invention is readily adaptable to other systems also.

DETAILED DESCRIPTION OF THE INVENTION

The present invention monitors the reset line of a microcontroller system, and upon sensing a reset signal, followed by sensing the release of the reset line, rapidly drives the reset line to the reset inactive state so as to avoid the microcontroller interpreting the slow recovery of the reset line to the inactive state as a non-microcontroller initiated reset. More particularly, in accordance with the preferred embodiment of the present invention, a strong pulse of current is injected from $V_{CC}$ into the reset bus of Motorola 68HC11/16 microcontroller system on every low to high transition to much more positively and rapidly drive the bus high. This current is typically 20 mA, and in the preferred implementation, will drive the reset line high with up to 400 pF on the bus.

Figure 1:
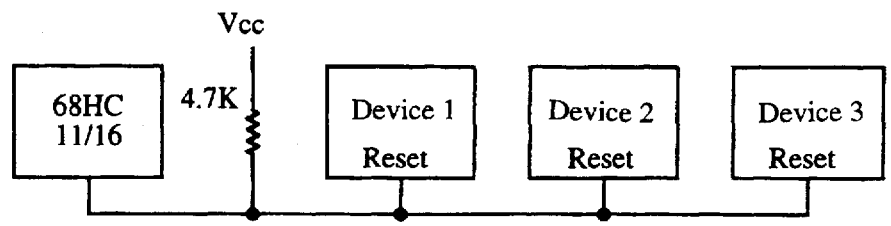
FIG. 1 illustrates the typical reset line connection in a 68HC11/16 microcontroller based system.
Figure 2:
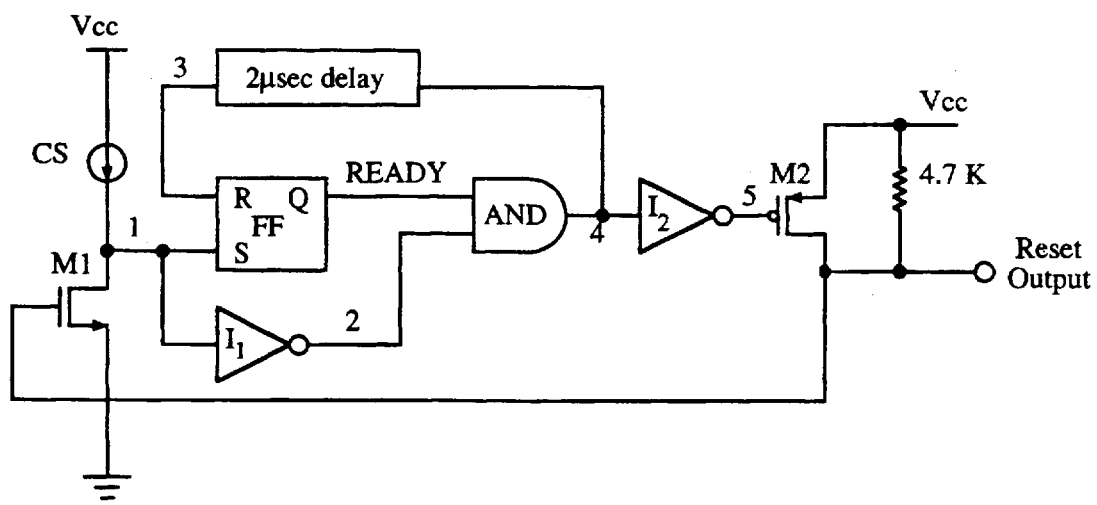
FIG. 2 is a circuit diagram for the preferred circuit for sensing the reset line and driving the same high upon sensing a reset followed by the release of the line.

An exemplary circuit for accomplishing this is shown in FIG. 2. In normal operation, node 5 will be high and p-channel transistor M2 will be off, with the 4.7 Kohm pull-up resistor pulling the reset line high. This holds n-channel transistor M1 on, holding node one low against the current source CS, with inverter $I_1$ holding node 2 high. As shall be seen, the RS flip flop FF has been reset by the 2 µsec delay, so that the Q output of the flip flop is low. Thus the output of the AND gate (node 4) is low, and the output of the inverter on node 5 is high, as initially stated.

To detect a valid low to high transition, first the reset pin has to fall below 0.7V, which is selected as the threshold of transistor M1. This turns off transistor M1, allowing current source CS to pull node 1 high, setting the RS flip-flop FF so that the READY signal will go high. However the inverter $I_1$ inverts the high state of node 1 to provide a low signal on node 2 as the second input to the AND gate, holding the output of the AND gate on node 4 low.

Once the microcontroller or any other device on the reset bus initiating the reset operation releases the reset bus, the reset bus will be pulled upward by the 4.7 Kohm resistor. When the reset bus goes above 0.7 V, transistor M1 will turn on again to pull node 1 low, and this in turn will cause node 2 to go high. Since READY is already high, node 4 will go high and node 5 will go low. This will turn on transistor M2, sized to provide the 20 mA pull-up current to the reset pin. 2 µsec after node 4 goes high, the 2 µsec delay will drive the reset line of the RS flip-flop FF high, resetting the flip-flop to drive the READY signal low. This drives the output of the flip-flop on node 4 low, and the output of the inverter $I_2$ high to turn off transistor M2, returning the circuit to the state initially described. The 2 µsec delay is exemplary only, in that longer of shorter reset line drive times could be used. For the preferred embodiment described herein, the 2 µsec drive time is sufficiently long to assure that the entire reset line stabilizes at the reset inactive state, and yet is short enough to not interfere with any reset that is attempted to be asserted during that time or cause damage to any device so attempting to assert a reset during that time.

In a typical application, the present invention is realized in integrated circuit form as part of a larger integrated circuit used in microcontroller systems for various monitoring and supervisory functions. As such, the integrated circuit will be coupled to the microcontroller bus, so that no special or additional connection to the reset line of the microcontroller bus is required.

It should be noted that the word microcontroller as used herein generally includes microcontrollers, microprocessors, microcomputers, single chip computers and the like, and systems incorporating the same. Also, while the preferred embodiment of the invention is described herein in terms of an active low reset system, and more specifically with a specific circuit and a specific exemplary voltage level indicative of the presence or absence of a currently asserted reset signal, such specificity is by way of example only, and no such specific limitations are to be implied in the present invention. In that regard, while voltage levels are a convenient electrical parameter to sense, other electrical parameters could be used to indicate the initiation of a reset, followed by the release of the reset pin, such as, by way of example, current in the reset line.

Thus while a specific embodiment of the present invention has been disclosed and described in detail herein, it will be obvious to those skilled in the art that various changes in form and detail may be made therein without departing from the spirit and scope thereof.

We claim:

1. A method for monitoring a reset signal on a bi-directional reset line in a system including a microcontroller and a device coupled to the reset line, the reset line coupled to a positive power supply source through a resistor, comprising:

sensing, by a sensing circuit, the reset signal driven to an active state by the device or the microcontroller, indicative of a reset operation;

generating a sensing signal upon sensing the reset signal being released by the device or the microcontroller; and turning on a first transistor coupled between the positive power supply source and the reset line to rapidly drive the reset signal to an inactive state responsive to said sensing signal for preventing the microcontroller from falsely interpreting a non-microcontroller initiated reset.

2. The method of claim 1 wherein sensing the reset signal driven to the active state comprises turning off a second transistor coupled to the reset line and the first transistor, and wherein generating the sensing signal upon sensing the reset signal being released comprises generating the sensing signal upon turning on the second transistor.

3. The method of claim 1 wherein turning on the first transistor comprises turning on the first transistor for a predetermined time period to rapidly drive the reset signal to the inactive state responsive to said sensing signal.

4. The method of claim 3 wherein the predetermined time period is approximately 2 μsec.

5. The method of claim 1 wherein said reset signal is an active low reset signal.

6. A method for monitoring a reset signal on a bi-directional reset line in a 68HC11/16 microcontroller based system including a microcontroller and a device coupled to the reset line, said reset line coupled to a positive power supply source through a resistor, comprising:

sensing, by a sensing circuit, the reset signal driven to an active state by the device or the microcontroller, indicative of a reset operation;

generating a sensing signal upon sensing the reset signal being released by the device or the microcontroller; and turning on a first transistor coupled between the reset line and the positive power supply source to rapidly drive the reset signal to an inactive state responsive to said sensing signal for preventing the microcontroller from falsely interpreting a non-microcontroller initiated reset.

7. The method of claim 6 wherein turning on the first transistor comprises turning on the first transistor for a predetermined time period to rapidly drive the reset signal to the inactive state responsive to said sensing signal.

8. The method of claim 7 wherein the predetermined time period is approximately 2 μsec.

9. The method of claim 6 wherein sensing the reset signal driven to the active state comprises turning off a second transistor coupled to the reset line and the first transistor.

10. The method of claim 9 wherein generating the sensing signal upon sensing the reset signal being released comprises generating the sensing signal upon turning on the second transistor.

11. Apparatus for monitoring a reset signal on a bi-directional reset line in a system including a microcontroller and a device coupled to the reset line, comprising:

a sensing circuit coupled to the reset line to sense the reset signal driven to an active state by the device or the microcontroller, indicative of a reset operation, and to generate a sensing signal upon sensing the reset signal being released by the device or the microcontroller;

a resistor coupled between the reset line and a first positive power supply source; and a first transistor coupled between the reset line and said first positive power supply source, and coupled to said sensing circuit, said first transistor turns on to rapidly drive the reset signal to an inactive state responsive to said sensing signal for preventing the microcontroller from falsely interpreting non-microcontroller initiated reset.

12. The apparatus of claim 11 wherein said first transistor is turned on for a predetermined time period to rapidly drive the reset signal to the inactive state responsive to said sensing signal.

13. The apparatus of claim 12 wherein the predetermined time period is approximately 2 μsec.

14. The apparatus of claim 11 wherein said sensing circuit comprises:

a second transistor coupled to the reset line and a second power supply source; and, a control circuit coupled between the second transistor and the first transistor, said control circuit turns on said first transistor responsive to the reset signal being released.

15. Apparatus for monitoring a reset signal an a bi-directional reset line in a system including a 68HC11/16 microcontroller and a device coupled to the reset line, comprising:

a sensing circuit coupled to the reset line to sense the reset signal driven to an active state by the device or the microcontroller, indicative of a reset operation; and to generate a sensing signal upon sensing the reset signal being released by the device or the microcontroller;

a resistor coupled between the reset line and a first positive power supply source; and a first transistor coupled between the reset line and said first positive power supply source, and coupled to said sensing circuit, said first transistor turns on to rapidly drive the reset signal to an inactive state responsive to said sensing signal for preventing the microcontroller from falsely interpreting a non-microcontroller initiated reset.

16. The apparatus of claim 15 wherein said sensing circuit includes a second transistor having a gate coupled to the reset line and the first transistor, and a control circuit coupled between said second transistor and said first transistor, the second transistor having a threshold voltage corresponding to a voltage on the reset line, wherein when the reset signal falls below the threshold voltage, the reset signal is indicative of the device or the microcontroller initiating a reset operation, and wherein when the reset signal rises above the threshold voltage, the reset signal indicative of the device or the microcontroller releasing the reset signal.

17. The apparatus of claim 16 wherein said first transistor is comprised of a p-channel transistor, said control circuit turns on said p-channel transistor responsive to said second transistor.

18. The apparatus of claim 17 wherein said control circuit turns said p-channel transistor for approximately 2 μsec.

19. An apparatus in a system including a microcontroller and a device, comprising:

a bi-directional reset line having a reset signal thereon, said reset line coupled to the microcontroller and the device;

a sensing circuit coupled to said reset line to sense said reset signal driven to an active state by the device or the microcontroller, indicative of a reset operation; and to generate a sensing signal upon sensing said reset signal being released by the device or the microcontroller;

a resistor coupled between said reset line and a positive power supply source; and a transistor coupled between said reset line and said positive power supply source, and coupled to said sensing circuit, said transistor turns on to rapidly drive said reset signal to an inactive state responsive to said sensing signal for preventing the microcontroller from falsely interpreting a non-microcontroller initiated reset.

\* \* \* \* \*